(12) United States Patent
Chou

(10) Patent No.: US 6,637,031 B1
(45) Date of Patent: Oct. 21, 2003

(54) MULTIMEDIA PRESENTATION LATENCY MINIMIZATION

(75) Inventor: Philip A. Chou, Menlo Park, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/205,875

(22) Filed: Dec. 4, 1998

(51) Int. Cl.$^7$ ............................................... H04N 7/173
(52) U.S. Cl. .......................... 725/87; 725/94; 725/98; 725/118; 709/219; 709/247; 348/384.1; 348/395.1; 348/438.1; 375/240.1; 375/240.11
(58) Field of Search ............................. 725/94, 98, 118, 725/240.26, 87; 370/468, 236, 230–232, 235; 709/219, 247; 348/394.1, 395.1, 409.1, 410.1, 425.1, 438.1; 375/240.1, 240.11, 240.19, 240.08

(56) References Cited

U.S. PATENT DOCUMENTS

| | | | |
|---|---|---|---|
| 5,262,875 A | * 11/1993 | Mincer et al. | 358/335 |
| 5,659,539 A | 8/1997 | Porter et al. | 395/200.61 |
| 5,742,343 A | 4/1998 | Haskell et al. | 348/415 |
| 5,886,733 A | * 3/1999 | Zdepski et al. | 348/13 |
| 5,982,436 A | * 11/1999 | Balakrishnan et al. | 348/409 |
| 6,014,694 A | * 1/2000 | Aharoni et al. | 709/219 |
| 6,185,625 B1 | * 2/2001 | Tso et al. | 709/247 |
| 6,282,206 B1 | * 8/2001 | Hindus et al. | 370/468 |

FOREIGN PATENT DOCUMENTS

EP 0695094 1/1996 ............ H04N/7/26

OTHER PUBLICATIONS

Chiang, T., et al., "Hierarchical Coding of Digital Television", *IEEE Communications Magazine*, vol. 32, No. 5, 38–45, (May 1, 1994).
Zheng, B., et al., "Multimedia Over High Speed Networks: Reducing Network Requirements with Fast Buffer Fillup", *IEEE Global Telecommunications Conference, NY, XP000825861*, 779–784, (1998).

* cited by examiner

*Primary Examiner*—Vivek Srivastava
*Assistant Examiner*—Ngoc Vu
(74) *Attorney, Agent, or Firm*—Lee & Hayes, PLLC

(57) ABSTRACT

To obtain real-time responses with interactive multimedia servers, the server provides at least two different audio/visual data streams. A first data stream has fewer bits per frame and provides a video image much more quickly than a second data stream with a higher number of bits and hence higher quality video image. The first data stream becomes available to a client much faster and may be more quickly displayed on demand while the second data stream is sent to improve the quality as soon as the playback buffer can handle it. In one embodiment, an entire video signal is layered, with a base layer providing the first signal and further enhancement layers comprising the second. The base layer may be actual image frames or just the audio portion of a video stream. The first and second streams are gradually combined in a manner such that the playback buffer does not overflow or underflow.

18 Claims, 6 Drawing Sheets

MULTIMEDIA PRESENTATION LATENCY MINIMIZATION

FIELD OF THE INVENTION

The present invention relates generally to multimedia communications and more specifically to latency minimization for on-demand interactive multimedia applications.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright © 1998, Microsoft Corporation, All Rights Reserved.

BACKGROUND

Information presentation over the Internet is changing dramatically. New time-varying multimedia content is now being brought to the Internet, and in particular to the World Wide Web (the web), in addition to textual HTML pages and still graphics. Here, time-varying multimedia content refers to sound, video, animated graphics, or any other medium that evolves as a function of elapsed time, alone or in combination. In many situations, instant delivery and presentation of such multimedia content, on demand, is desired. "On-demand" is a term for a wide set of technologies that enable individuals to select multimedia content from a central server for instant delivery and presentation on a client (computer or television). For example, video-on-demand can be used for entertainment (ordering movies transmitted digitally), education (viewing training videos) and browsing (viewing informative audiovisual material on a web page) to name a few examples.

Users are generally connected to the Internet by a communications link of limited bandwidth, such as a 56 kilo bits per second (Kbps) modem or an integrated services digital network (ISDN) connection. Even corporate users are usually limited to a fraction of the 1.544 mega bits per second (Mbps) T-1 carrier rates. This bandwidth limitation provides a challenge to on-demand systems: it may be impossible to transmit a large amount of image or video data over a limited bandwidth in the short amount of time required for "instant delivery and presentation." Downloading a large image or video may take hours before presentation can begin. As a consequence, special techniques have been developed for on-demand processing of large images and video.

A technique for providing large images on demand over a communications link with limited bandwidth is progressive image transmission. In progressive image transmission, each image is encoded, or compressed, in layers, like an onion. The first (core) layer, or base layer, represents a low-resolution version of the image. Successive layers represent successively higher resolution versions of the image. The server transmits the layers in order, starting from the base layer. The client receives the base layer, and instantly presents to the user a low-resolution version of the image. The client presents higher resolution versions of the image as the successive layers are received. Progressive image transmission enables the user to interact with the server instantly, with low delay, or low latency. For example, progressive image transmission enables a user to browse through a large database of images, quickly aborting the transmission of the unwanted images before they are completely downloaded to the client.

Similarly, streaming is a technique that provides time-varying content, such as video and audio, on demand over a communications link with limited bandwidth. In streaming, audiovisual data is packetized, delivered over a network, and played as the packets are being received at the receiving end, as opposed to being played only after all packets have been downloaded. Streaming technologies are becoming increasingly important with the growth of the Internet because most users do not have fast enough access to download large multimedia files quickly. With streaming, the client browser or application can start displaying the data before the entire file has been transmitted.

In a video on-demand delivery system that uses streaming, the audiovisual data is often compressed and stored on a disk on a media server for later transmission to a client system. For streaming to work, the client side receiving the data must be able to collect the data and send it as a steady stream to a decoder or an application that is processing the data and converting it to sound or pictures. If the client receives the data more quickly than required, it needs to save the excess data in a buffer. Conversely, if the client receives the data more slowly than required, it needs to play out some of the data from the buffer. Storing part of a multimedia file in this manner before playing the file is referred to as buffering. Buffering can provide smooth playback even if the client temporarily receives the data more quickly or more slowly than required for real-time playback.

There are two reasons that a client can temporarily receive data more quickly or more slowly than required for real-time playback. First, in a variable-rate transmission system such as a packet network, the data arrives at uneven rates. Not only does packetized data inherently arrive in bursts, but even packets of data that are transmitted from the sender at an even rate may not arrive at the receiver at an even rate. This is due to the fact that individual packets may follow different routes, and the delay through any individual router may vary depending on the amount of traffic waiting to go through the router. The variability in the rate at which data is transmitted through a network is called network jitter.

A second reason that a client can temporarily receive data more quickly or more slowly than required for real-time playback is that the media content is encoded to variable bit rate. For example, high-motion scenes in a video may be encoded with more bits than low-motion scenes. When the encoded video is transmitted with a relatively constant bit rate, then the high-motion frames arrive at a slower rate than the low-motion frames. For both these reasons (variable-rate source encoding and variable-rate transmission channels), buffering is required at the client to allow a smooth presentation.

Unfortunately, buffering implies delay, or latency. Start-up delay refers to the latency the user experiences after he signals the server to start transmitting data from the beginning of the content (such as when a pointer to the content is selected by the user) before the data can be decoded by the client system and presented to the user. Seek delay refers to the latency the user experiences after he signals to the server to start transmitting data from an arbitrary place in the middle of the content (such as when a seek bar is dragged to a particular point in time) before the data can be decoded and presented. Both start-up and seek delays occur because even after the client begins to receive new data, it must wait until its buffer is sufficiently full to begin playing out of the buffer. It does this in order to guard against future buffer underflow due to network jitter and variable-bit rate compression. For typical audiovisual coding on the Internet, start-up and seek delays between two and ten seconds are common.

Large start-up and seek delays are particularly annoying when the user is trying to browse through a large amount of audiovisual content trying to find a particular video or a particular location in a video. As in the image browsing scenario using progressive transmission, most of the time the user will want to abort the transmission long before all the data are downloaded and presented. In such a scenario, delays of two to ten seconds between aborts seem intolerable. What is needed is a method for reducing the start-up and seek delays for such "on demand" interactive multimedia applications.

SUMMARY OF THE INVENTION

The above-identified problems, shortcomings and disadvantages with the prior art, as well as other problems, shortcoming and disadvantages, are solved by the present invention, which will be understood by reading and studying the specification and the drawings. The present invention minimizes the start-up and seek delays for on-demand interactive multimedia applications, when the transmission bit rate is constrained.

In one embodiment, a server provides at least two different data streams. A first data stream is a low resolution stream encoded at a bit rate below the transmission bit rate. A second data stream is a normal resolution stream encoded at a bit rate equal to the transmission bit rate. The server initially transmits the low resolution stream faster than real time, at a bit rate equal to the transmission bit rate. The client receives the low resolution stream faster than real time, but decodes and presents the low resolution stream in real time.

Unlike previous systems, the client does not need to wait for its buffer to become safely full before beginning to decode and present. The reason is that even at the beginning of the transmission, when the client buffer is nearly empty, the buffer will not underflow, because it is being filled at a rate faster than real time, but is being played out at a rate equal to real time. Thus, the client can safely begin playing out of its buffer as soon as data are received. In this way, the delay due to buffering is reduced to nearly zero.

When the client buffer has grown sufficiently large to guard against future underflow by the normal resolution stream, the server stops transmission of the low resolution stream and begins transmission of the normal resolution stream. The system of the present invention reduces the start-up or seek delay for interactive multimedia applications such as video on-demand, at the expense of initially lower quality. The invention includes systems, methods, computers, and computer-readable media of varying scope. Besides the embodiments, advantages and aspects of the invention described here, the invention also includes other embodiments, advantages and aspects, as will become apparent by reading and studying the drawings and the following description.

DESCRIPTION OF THE EMBODIMENTS

In the following detailed description of the embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present inventions. The following detailed description is, therefore, not to be taken in a limiting sense, and the scope of the present inventions is defined only by the appended claims.

The present invention is a system for achieving low latency responses from interactive multimedia servers, when the transmission bit rate is constrained. A server provides at least two different data streams. A first data stream is a low resolution stream encoded at a bit rate below the transmission bit rate. A second data stream is a normal resolution stream encoded at a bit rate equal to the transmission bit rate. The server initially transmits the low resolution stream faster than real time, at a bit rate equal to the transmission bit rate. The client receives the low resolution stream faster than real time, but decodes and presents the low resolution stream in real time. When the client buffer has grown sufficiently large to guard against future underflow by the normal resolution stream, the server stops transmission of the low resolution stream and begins transmission of the normal resolution stream. The system of the present invention reduces the start-up or seek delay for interactive multimedia applications such as video on-demand, at the expense of initially lower quality.

The detailed description of this invention is divided into four sections. The first section provides a general description of a suitable computing environment in which the invention may be implemented including an overview of a network architecture for generating, storing and transmitting audio/visual data using the present invention. The second section illustrates the data flow for a streaming media system for use with the network architecture described in the first section. The third section describes the methods of exemplary embodiments of the invention. The fourth section is a conclusion which includes a summary of the advantages of the present invention.

Figure 1:
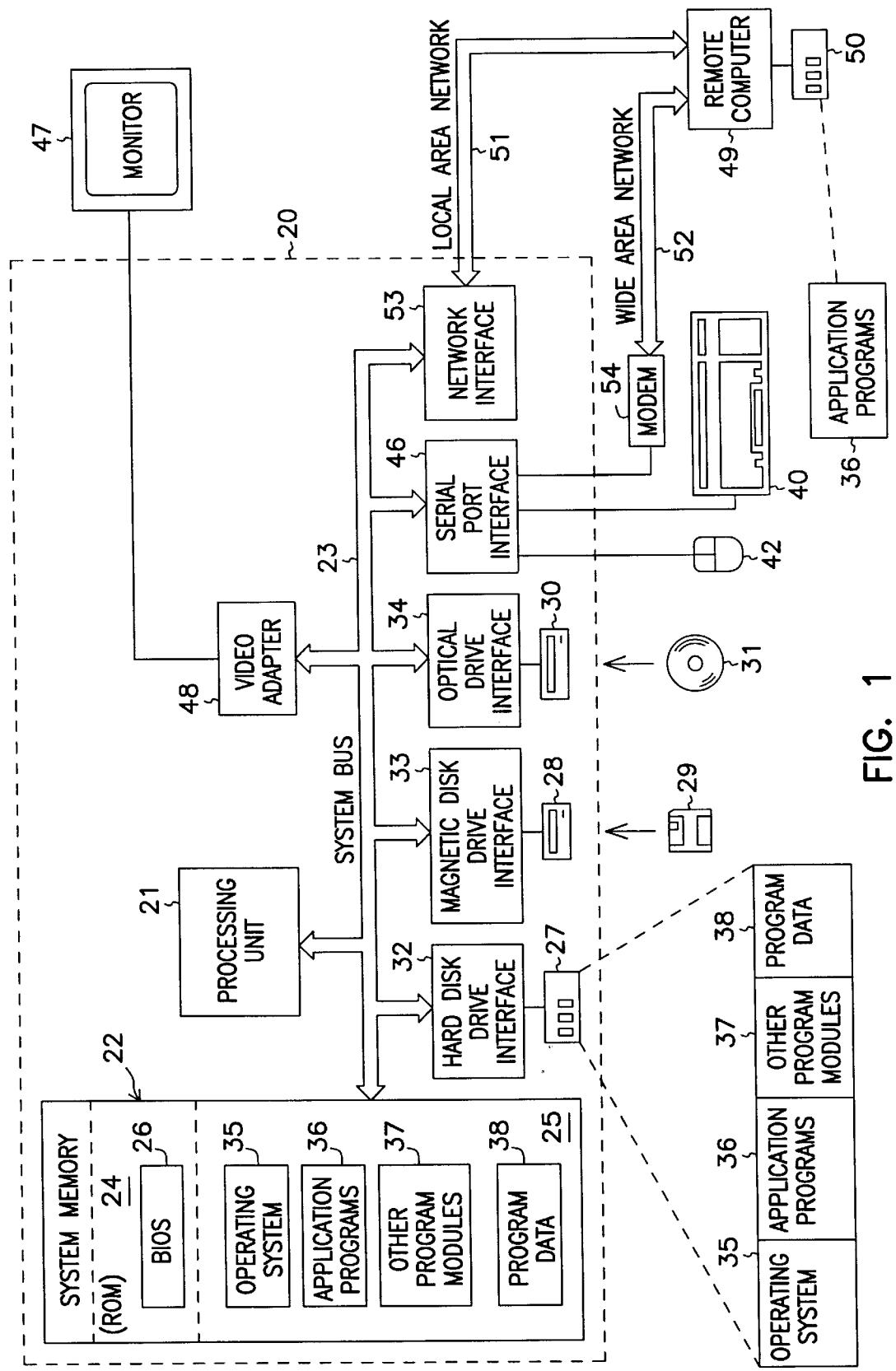
FIG. 1 is a diagram of an exemplary computer system in which the invention may be implemented.

Computing Environment. FIG. 1 provides a brief, general description of a suitable computing environment in which the invention may be implemented. The invention will hereinafter be described in the general context of computer-executable program modules containing instructions executed by a personal computer (PC). Program modules include routines, programs, objects, components, data structures, etc. that perform particular tasks or implement particular abstract data types. Those skilled in the art will appreciate that the invention may be practiced with other computer-system configurations, including hand-held devices, multiprocessor systems, microprocessor-based programmable consumer electronics, network PCs, minicomputers, mainframe computers, and the like. The invention may also be practiced in distributed computing environments where tasks are performed by remote processing devices linked through a communications network. In a distributed computing environment, program modules may be located in both local and remote memory storage devices.

FIG. 1 employs a general-purpose computing device in the form of a conventional personal computer 20, which includes processing unit 21, system memory 22, and system bus 23 that couples the system memory and other system components to processing unit 21. System bus 23 may be any of several types, including a memory bus or memory controller, a peripheral bus, and a local bus, and may use any of a variety of bus structures. System memory 22 includes read-only memory (ROM) 24 and random-access memory (RAM) 25. A basic input/output system (BIOS) 26, stored in ROM 24, contains the basic routines that transfer information between components of personal computer 20. BIOS 24 also contains start-up routines for the system. Personal computer 20 further includes hard disk drive 27 for reading from and writing to a hard disk (not shown), magnetic disk drive 28 for reading from and writing to a removable magnetic disk 29, and optical disk drive 30 for reading from and writing to a removable optical disk 31 such as a CD-ROM or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, those skilled in the art will appreciate that other types of computer-readable media which can store data accessible by a computer may also be used in the exemplary operating environment. Such media may include magnetic cassettes, flashmemory cards, digital versatile disks, Bernoulli cartridges, RAMs, ROMs, and the like.

Program modules may be stored on the hard disk, magnetic disk 29, optical disk 31, ROM 24 and RAM 25. Program modules may include operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial-port interface 46 coupled to system bus 23; but they may be connected through other interfaces not shown in FIG. 1, such as a parallel port, a game port, or a universal serial bus (USB). A monitor 47 or other display device also connects to system bus 23 via an interface such as a video adapter 48. In addition to the monitor, personal computers typically include other peripheral output devices (not shown) such as speakers and printers.

Personal computer 20 may operate in a networked environment using logical connections to one or more remote computers such as remote computer 49. Remote computer 49 may be another personal computer, a server, a router, a network PC, a peer device, or other common network node. It typically includes many or all of the components described above in connection with personal computer 20; however, only a storage device 50 is illustrated in FIG. 1. The logical connections depicted in FIG. 1 include local-area network (LAN) 51 and a wide-area network (WAN) 52. Such networking environments are commonplace in offices, enterprise-wide computer networks, intranets and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 may be internal or external to PC 20, and connects to system bus 23 via serial-port interface 46. In a networked environment, program modules depicted as residing within 20 or portions thereof may be stored in remote storage device 50. Of course, the network connections shown are illustrative, and other means of establishing a communications link between the computers may be substituted.

Figure 2:
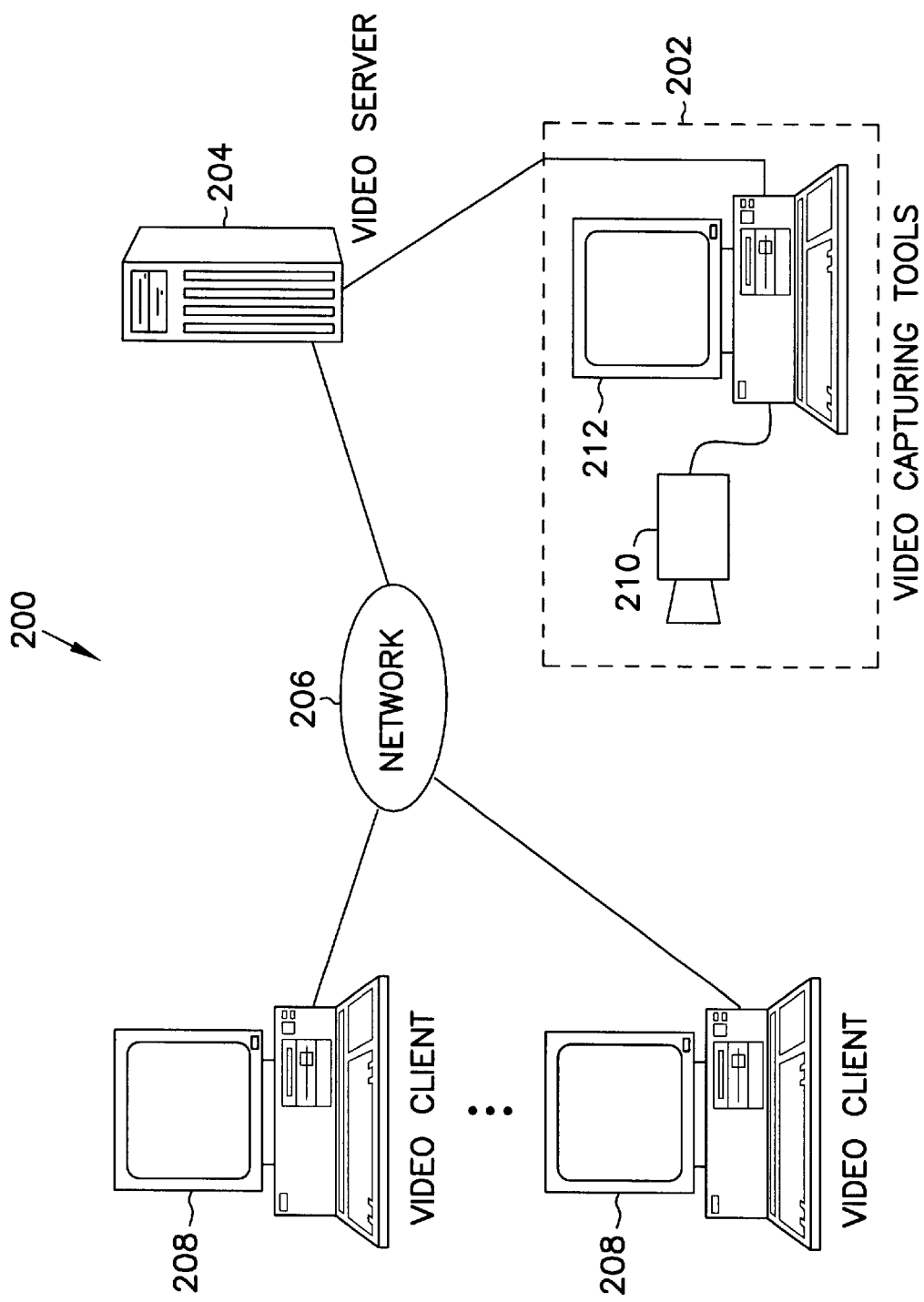
FIG. 2 is a diagram of an example network architecture in which embodiments of the present invention are incorporated.

FIG. 2 is a diagram of an example network architecture 200 in which embodiments of the present invention are implemented. The example network architecture 200 comprises video capturing tools 202, a video server 204, a network 206 and one or more video clients 208.

The video capturing tools 202 comprise any commonly available devices for capturing video and audio data, encoding the data and transferring the encoded data to a computer via a standard interface. The example video capturing tools 202 of FIG. 2 comprise a camera 210 and a computer 212 having a video capture card, compression software and a mass storage device. The video capturing tools 202 are coupled to a video server 204 having streaming software and optionally having software tools enabling a user to manage the delivery of the data.

The video server 204 comprises any commonly available computing environment such as the exemplary computing environment of FIG. 1, as well as a media server environment that supports on-demand distribution of multimedia content. The media server environment of video server 204 comprises streaming software, one or more data storage units for storing compressed files containing multimedia data, and a communications control unit for controlling information transmission between video server 204 and video clients 208. The video server 204 is coupled to a network 206 such as a local-area network or a wide-area network. Audio, video, illustrated audio, animations, and other multimedia data types are stored on video server 204 and delivered by an application on-demand over network 206 to one or more video clients 208.

The video clients 208 comprise any commonly available computing environments such as the exemplary computing environment of FIG. 1. The video clients 208 also comprise any commonly available application for viewing streamed multimedia file types, including QuickTime (a format for video and animation), RealAudio (a format for audio data), RealVideo (a format for video data), ASF (Advanced Streaming Format) and MP4 (the MPEG-4 file format). Two video clients 208 are shown in FIG. 2. However, those of ordinary skill in the art can appreciate that video server 204 may communicate with a plurality of video clients.

In operation, for example, a user clicks on a link to a video clip or other video source, such as camera 210 used for video conferencing or other purposes, and an application program for viewing streamed multimedia files launches from a hard disk of the video client 208. The application begins loading in a file for the video which is being transmitted across the network 206 from the video server 204. Rather than waiting for the entire video to download, the video starts playing after an initial portion of the video has come across the network 206 and continues downloading the rest of the video while it plays. The user does not have to wait for the entire video to download before the user can start viewing. However, in existing systems there is a delay for such "on demand" interactive applications before the user can start viewing the initial portion of the video. The delay, referred to herein as a start-up delay or a seek delay, is experienced by the user between the time when the user signals the video server 204 to start transmitting data and the time when the data can be decoded by the video client 208 and presented to the user. However, the present invention, as described below, achieves low latency responses from video server 204 and thus reduces the start-up delay and the seek delay.

An example computing environment in which the present invention may be implemented has been described in this section of the detailed description. In one embodiment, a network architecture for on-demand distribution of multimedia content comprises video capture tools, a video server, a network and one or more video clients.

Figure 3:
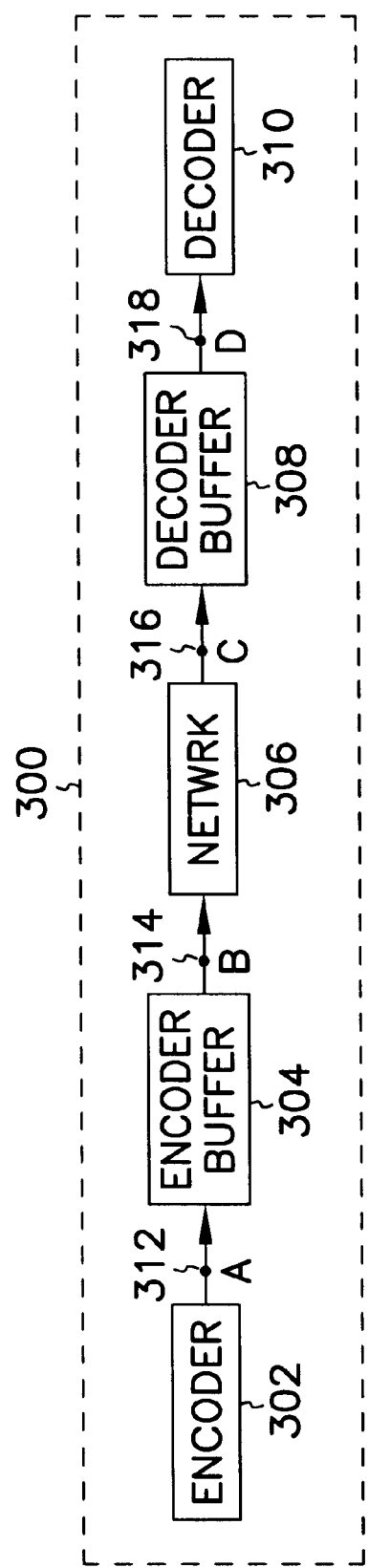
FIG. 3 is a block diagram representing the data flow for a streaming media system for use with the computer network of FIG. 2.

Data Flow for a Streaming Media System. The data flow for an example embodiment of a streaming media system is described by reference to FIGS. 3, 4A, 4B, 4C, 4D and 4E. FIG. 3 is a block diagram representing the data flow for a streaming media system 300 for use with the network architecture of FIG. 2. The streaming media system 300 comprises an encoder 302 which may be coupled to camera 210 or other real time or uncompressed video sources, an encoder buffer 304, a network 306, a decoder buffer 308 and a decoder 310.

The encoder 302 is a hardware or software component that encodes and/or compresses the data for insertion into the encoder buffer 304. The encoder buffer 304 is one or more hardware or software components that stores the encoded data until such time as it can be released into the network 306. For live transmission such as video conferencing, the encoder buffer 304 may be as simple as a first-in first-out (FIFO) queue. For video on-demand from a video server 204, the encoder buffer 304 may be a combination of a FIFO queue and a disk file on the capture tools 202, transmission. buffers between the capture tools 202 and the video server 204, and a disk file and output FIFO queue on the video server 204. The decoder buffer 308 is a hardware or software component that receives encoded data from the network 306, and stores the encoded data until such time as it can be decoded by decoder 310. The decoder 310 is a hardware or software component that decodes and/or decompresses the data for display.

In operation, each bit produced by the encoder 302 passes point A 312, point B 314, point C 316, and point D 318 at a particular instant in time. A graph of times at which bits cross a given point is referred to herein as a schedule. The schedules at which bits pass point A 312, point B 314, point C 316, and point D 318 can be illustrated in a diagram such as shown in the FIGS. 4A, 4B, 4C, 4D and 4E.

FIGS. 4A, 4B, 4C, 4D and 4E are schedules illustrating data flow for example embodiments of the streaming media system of FIG. 3. As shown in FIGS. 4A, 4B, 4C, 4D and 4E, the y-axis corresponds to the total number of bits that have crossed the respective points (i.e. point A, point B, point C, and point D in FIG. 3) and the x-axis corresponds to elapsed time. In the example shown in FIG. 4A, schedule A corresponds to the number of bits transferred from the encoder 302 to the encoder buffer 304. Schedule B corresponds to the number of bits that have left the encoder buffer 304 and entered the network 306. Schedule C corresponds to the number of bits received from the network 306 by the decoder buffer 308. Schedule D corresponds to the number of bits transferred from the decoder buffer 308 to the decoder 310.

Figure 4A:
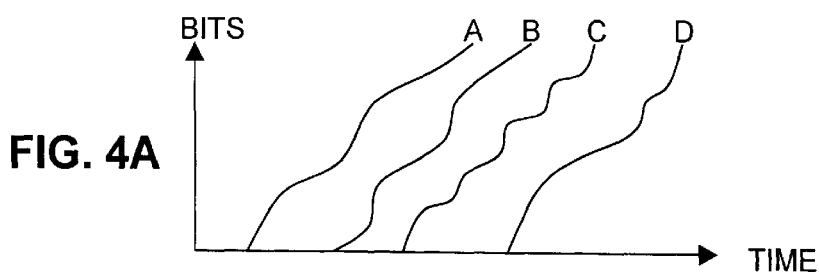
FIGS. 4A, 4B, 4C, 4D, and 4E are schedules illustrating data flow for example embodiments of the streaming media system of FIG. 3.
Figure 4B:
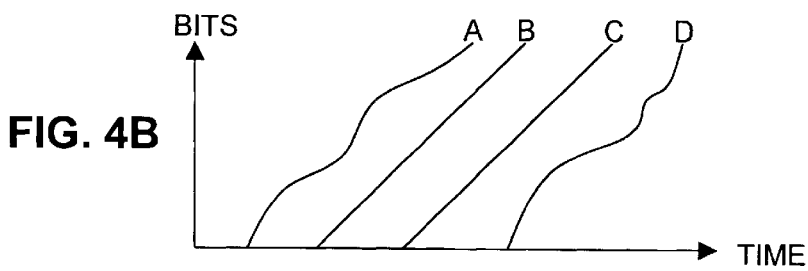

In the example shown in FIG. 4B, the network 306 has a constant bit rate and a constant delay. As a result, schedules B and C are linear and are separated temporally by a constant transmission delay.

Figure 4C:
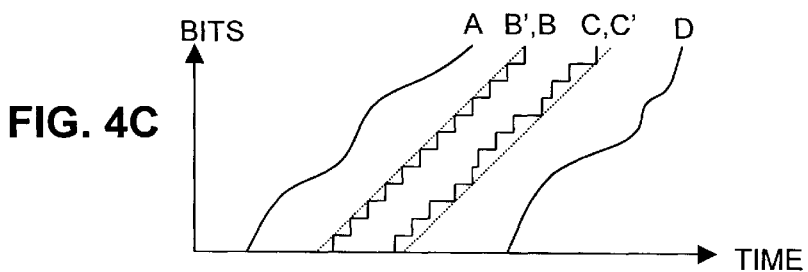

In the example shown in FIG. 4C, the network 306 is a packet network. As a result, schedules B and C have a staircase form. The transmission delay is generally not constant. Nevertheless, there exist linear schedules B' and C' that provide lower and upper bounds for schedules B and C respectively. Schedule B' is the latest possible linear schedule at which encoded bits are guaranteed to be available for transmission. Schedule C' is the earliest possible linear schedule at which received bits are guaranteed to be available for decoding. The gap between schedules B' and C' is the maximum reasonable transmission delay (including jitter and any retransmission time) plus an allowance for the packetization itself. In this way, a packet network can be reduced, essentially, to a constant bit rate, constant delay channel.

Figure 4D:
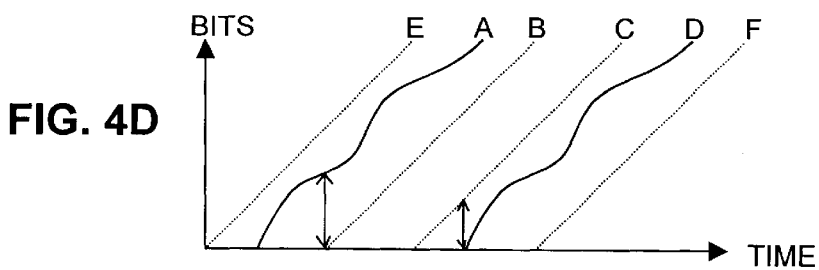

Referring now to the example shown in FIG. 4D, for real-time applications the end-to-end delay (from capture to presentation) must be constant; otherwise there would be temporal warping of the presentation. Thus, if the encoder and decoder have a constant delay, schedules A and D are separated temporally by a constant delay, as illustrated in FIG. 4D.

At any given instant in time, the vertical distance between schedules A and B is the number of bits in the encoder buffer, and the vertical distance between schedules C and D is the number of bits in the decoder buffer. If the decoder attempts to remove more bits from the decoder buffer than exist in the buffer (i.e., schedule D tries to occur ahead of schedule C), then the decoder buffer underflows and an error occurs. To prevent this from happening, schedule A must not precede schedule E, as illustrated in FIG. 4D. In FIG. 4D, schedules E and A are congruent to schedules C and D.

Likewise, the encoder buffer should never underflow; otherwise the channel is under-utilized and quality suffers. An encoder rate control mechanism therefore keeps schedule A between the bounds of schedules E and B. This implies that schedule D lies between the bounds of schedules C and F, where schedules E, A, and B are congruent to schedules C, D, and F, as shown in FIG. 4D. The decoder buffer must be at least as big as the encoder buffer (otherwise it would overflow), but it need not be any bigger. For the purpose of this description, it is assumed that the encoder and decoder buffers are the same size. (In practice the encoder buffer may be combined with a disk and a network transmitter buffer, and the decoder buffer may be combined with a network receiver buffer, so the overall buffer sizes at the transmitter and receiver may differ.) The end-to-end delay is the sum of the transmission delay and the decoder buffer delay (or equivalently the encoder buffer delay).

Figure 4E:
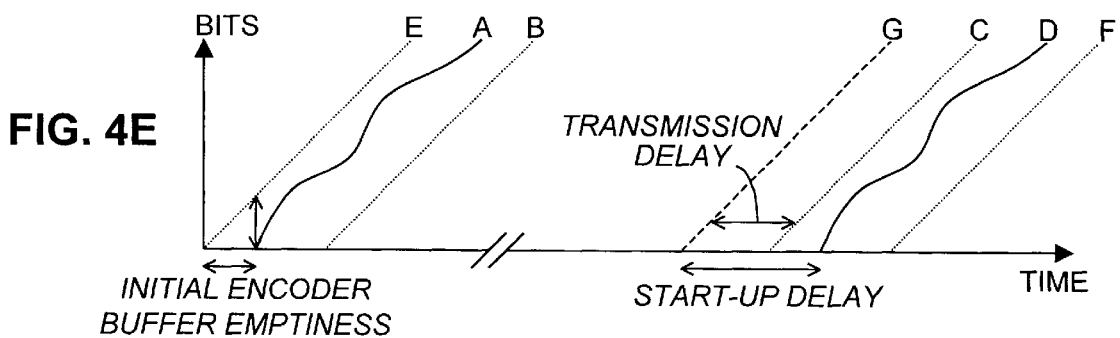

Referring now to FIG. 4E, in an on-demand system, the media content is pre-encoded and stored on a disk on a media server for later transmission to a client. In this case, an actual transmission schedule G may come an arbitrarily long time after the original transmission schedule B, as illustrated in FIG. 4E. Although schedule B is no longer the transmission schedule, it continues to guide the encoder's rate control mechanism, so that the decoder buffer size can be bounded.

In an on-demand system, a user experiences a delay between when the user signals the video server to start transmitting and when the first bit can be decoded and presented to the user. This delay is referred to as a start-up delay and is illustrated in FIG. 4E as the horizontal distance between schedule G and schedule D. The start-up delay is the sum of the transmission delay, which is a constant, and the initial decoder buffer fullness (in seconds) or equivalently the initial encoder buffer emptiness (in seconds). The buffer fullness or emptiness measured in seconds is converted from the buffer fullness or emptiness measured in bits by dividing the latter by the bit rate. By reducing the initial encoder buffer emptiness (shown in FIG. 4E as the horizontal distance between schedule E and schedule A) to near zero, the start-up delay is minimized to nearly the transmission delay only.

At the beginning of an audio or video clip, it is simple to set the encoder buffer emptiness to near zero. The encoder buffer merely needs to start off full of leading zeros. These leading zeros need not be transmitted, but they cause the encoder's rate control mechanism to allow the first few frames to be coded with only a very few bits, until the encoder buffer begins to empty out. In this way, the start-up delay can be minimized, at the expense of the quality of the first few frames.

It is not always possible to control the initial encoder buffer emptiness. For example, suppose a user directs the server to seek to a random access point in the interior of some pre-encoded content. Then the initial encoder buffer emptiness of the new segment will be arbitrary, as determined by the encoder's rate control mechanism at the time the content was encoded. In this case, the seek delay may be as large as the transmission delay plus the decoder buffer delay. However, the present invention, as described below, reduces the start-up and seek delays.

The data flow for an example embodiment of a streaming media system has been described in this section of the detailed description. While the invention is not limited to any particular streaming media system, for sake of clarity a simplified streaming media system has been described.

Methods of an Exemplary Embodiment of the Invention. In the previous section, the data flow for an example embodiment of a streaming media system was described. In this section, the particular methods performed by a media server of such a streaming media system are described by reference to a series of schedules. The methods to be performed by the media server constitute computer programs made up of computer-executable instructions. The processor of the media server executes the instructions from computer-readable media.

This section describes a method for reducing the start-up or seek delay described above for on-demand interactive applications, when the transmission bit rate is constrained. According to one embodiment of the present invention, a media server constructs an encoded bit stream for time-varying multimedia content, such as video or audio, by representing the initial portion of the content with a low quality encoding and representing a subsequent portion of the content with a normal quality encoding. The resulting encoded bit stream is decoded by a video client with low delay and without overflowing or underflowing a decoder buffer of the video client. The method has the advantage of reducing the start-up or seek delay for on-demand interactive applications when the transmission bit rate is constrained.

As referred to herein, quality (also referred to as resolution) is a measure of detail in an image or a sound. The quality of an image is commonly measured in pixels per inch and in the number of bytes used to describe the color values at each pixel. The quality of audio data is commonly measured in the number of samples per second.

In one embodiment shown by reference to FIGS. 5, 6, 7, 8, and 9, low bit rate information is present on the media server, in addition to full bit rate information for the time-varying multimedia content. An encoded bit stream of the present invention is derived by splicing together the low bit rate information for an initial portion of the content with the full bit rate information for a subsequent portion of the content. In an alternate embodiment shown by reference to FIGS. 6 and 10, only the full bit rate information is used to construct the encoded bit stream. In the alternate embodiment, an encoded bit stream of the present invention is derived by reducing the number of bits in the initial frames of the full bit rate information.

FIGS. 5, 6, 7, 8, and 9 illustrate an example embodiment of a method of constructing an encoded bit stream for time-varying multimedia content by splicing together a low quality initial portion of the content with a normal quality subsequent portion of the content. In the schedules shown in FIGS. 5, 6, 7, 8, and 9, the y-axis corresponds to the total number of bits that have crossed a particular point and the x-axis corresponds to elapsed time.

In the example embodiment, the media server receives a request from a video client to begin transmitting a segment of time-varying multimedia content at a full bit rate R. The segment has been pre-encoded at the same full bit rate R. Typically, the segment is excerpted from a longer segment of content encoded at the same full bit rate R (i.e. normal quality), so that the initial encoder buffer emptiness for the segment (and hence the start-up delay) is arbitrary and not minimal in general. When the start-up delay is not minimal, the media server constructs a new full bit rate encoding for the segment that has a lower initial encoder buffer emptiness (and hence a lower start-up delay) yet still respects the decoder's buffer constraints, by splicing together the beginning of an existing low bit rate (i.e. low quality) sequence with the tail of the original full bit rate (i.e. normal quality) sequence. The new encoding is transmitted at full bit rate R, and will not overflow or underflow the decoder's buffer when the splicing is correctly timed. One method to determine the timing of such a splicing is now described by reference to FIGS. 5, 6, 7, 8 and 9.

Figure 5:
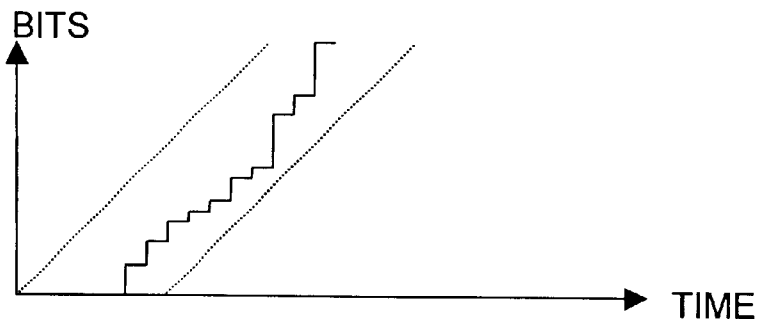
FIG. 5 is a decoding schedule for multimedia content pre-encoded at a full bit rate.
Figure 6:
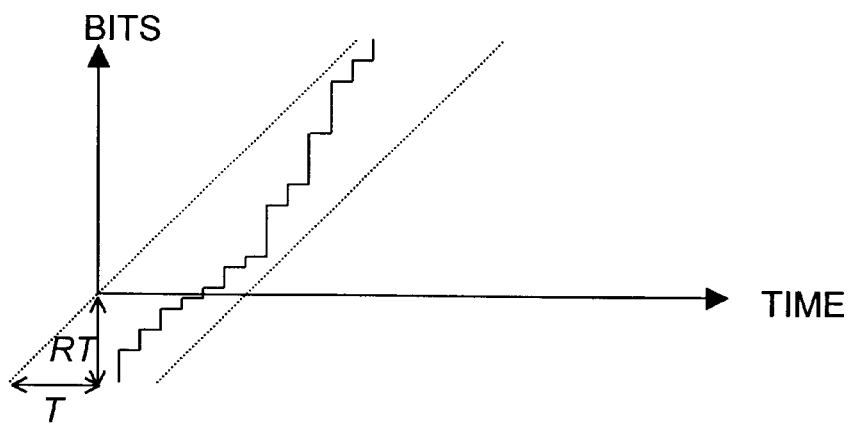
FIG. 6 is a schedule showing the full bit rate encoding of FIG. 5 advanced by T seconds.

FIG. 5 is an example decoding schedule for multimedia content pre-encoded at a full bit rate. FIG. 6 is a decoding schedule showing the full bit rate encoding of FIG. 5 advanced by T seconds. The original full bit rate encoding of the content is advanced by T seconds, where T is the amount by which the start-up delay is desired to be reduced. In order to respect the buffer constraints, the encoding must slide leftward and downward within a tube defined by the buffer constraints as shown in FIG. 6.

Figure 7:
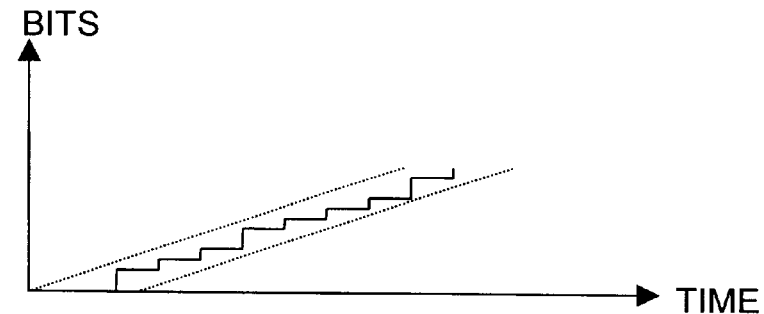
FIG. 7 is a schedule showing a low bit rate encoding of the content shown in FIG. 5.
Figure 8:
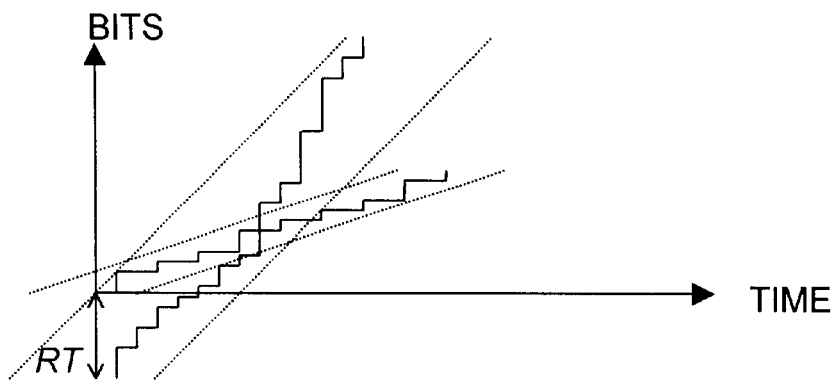
FIG. 8 is a schedule showing the low bit rate encoding schedule of FIG. 7 advanced by T seconds and superimposed on the advanced schedule of FIG. 6.

FIG. 7 is a schedule showing a low bit rate encoding for the same content as in FIG. 5. In this example embodiment, the low bit rate encoding of the content has been pre-encoded according to the schedule shown in FIG. 7 and exists on the media server. FIG. 8 is a decoding schedule showing the low bit rate encoding of FIG. 7 advanced by T seconds and superimposed on the advanced decoding schedule for the full bit rate encoding of FIG. 6. In the example embodiment shown in FIG. 8, the low bit rate encoding is advanced so that its starting time matches that of the full bit rate encoding (which has been advanced by T seconds as shown in FIG. 6). The low bit rate encoding can only be advanced so far as it does not violate the full bit rate buffer constraints.

Figure 9:
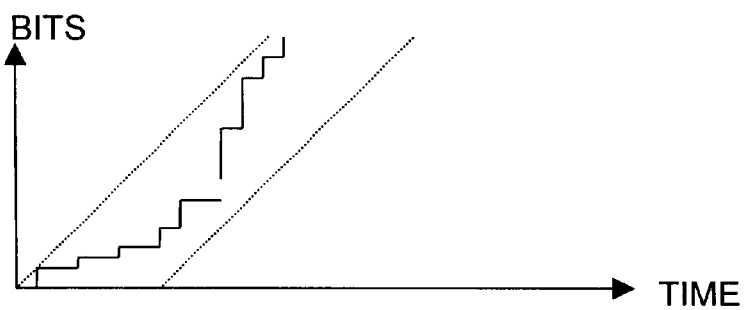
FIG. 9 is a schedule showing the transition from the delivery of the low bit rate encoded stream of FIG. 7 to the data stream of FIG. 6, with a gap to indicate optional bit stuffing.

FIG. 9 is a schedule showing the transition from the delivery of the low bit rate encoding stream of FIG. 7 to the full bit rate encoding of FIG. 6. The low bit rate encoding is used until its schedule intersects the full bit rate encoding, then the full bit rate encoding is used. That is, the low bit rate encoding is used until at least RT bits are saved relative to the full bit rate encoding. Then the full bit rate encoding is used starting at its next random access point as shown in FIG. 9. Some "bit-stuffing" may be required, as represented by the gap in FIG. 9, although the stuffed bits need not be transmitted.

An example method of constructing an encoded bit stream for time-varying multimedia content by splicing together a low quality initial portion of the content with a normal quality subsequent portion of the content has been shown by reference to FIGS. 5, 6, 7, 8, and 9. In the example embodiment described, the media server manipulates the initial encoder buffer emptiness (and hence the start up delay) for the multimedia content by constructing a new encoded bit stream out of one or more existing encoded bit streams for the multimedia content. In order to construct a new encoded bit stream, the media server requires low bit rate information for the content in addition to the usual full bit rate information. In one embodiment, the low bit rate information is present on the media server, in addition to the usual full bit rate information for the segment. As one of skill in the art will recognize, such low bit rate information is frequently available on such media servers for the purposes of flow control.

One example of an encoder which provides lower and higher bit rate information is found in the U.S. Patent application entitled "Multiple Multicasting of Multimedia Streams," having ser. No. 08/855,246, filed on May 13, 1997 and assigned to the same assignee as the present invention. The application describes the provisions of temporally additive base and enhancement layers. Further methods include the use of a first lower bit rate stream representing a reduced number of frames per second, with enhancement layers comprising the missing frames. In a further embodiment, the first stream is a lower pixel density stream, with at least one enhancement layer comprising an error image to enhance the number of pixels. A still further first bit stream utilizes indices to lookup tables wherein the indices are truncated to provide the lower bit rate and corresponding lower image quality from the lookup table. This is sometimes referred to as embedded code.

Figure 10:
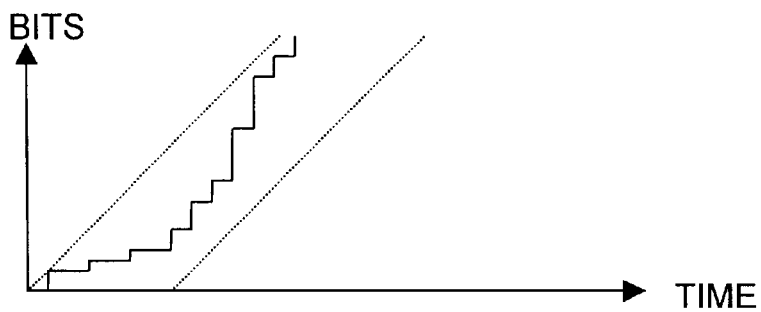
FIG. 10 is a schedule showing the advanced schedule of FIG. 6 with a total of RT bits removed from the initial frames.

FIGS. 6 and 10 illustrate an alternate embodiment of a method of constructing an encoded bit stream for time-varying multimedia content. In the alternate embodiment only the full bit rate information is used to construct an encoded bit stream. The encoded bit stream is constructed from an embedded bit stream by reducing a number of enhancement layers for the initial portion of the content. In the alternate embodiment, the encoding of each frame is embedded so that an arbitrary suffix of the encoding of each frame can be discarded without affecting the other frames. Referring to the advanced schedule shown in FIG. 6, a total of RT bits can be directly and arbitrarily removed from some number of initial frames, to produce a stream whose schedule is shown in FIG. 10. Such a stream respects the buffer constraints, yet has low delay at the price of lower quality initial frames. A method of removing bits from the initial frames of the full bit rate information to construct an encoded bit stream according to the present invention has been shown by reference to FIGS. 6 and 10.

The particular methods performed by a media server of example embodiments of the invention have been described by reference to a series of schedules. In the example embodiments, initial frames of the segment are coded with fewer bits, and hence their quality is reduced as compared to subsequent frames of the segment coded with more bits. This is the cost of reducing the delay. However, reducing the delay in the manner described above has several advantages that are described below.

Conclusion. The present invention improves the performance of interactive multimedia servers. Performance is improved by a server providing at least two different multimedia streams. A first stream has a lower bit rate and can be transmitted much more quickly than a second stream with a higher bit rate and hence higher quality video image. The first stream builds up the client buffer faster and may be more quickly displayed on demand while the second signal is sent to improve the quality as soon as the playback buffer can handle it.

The present invention allows for faster delivery and presentation of on demand multimedia content by minimizing the latency between when a user signals a server to begin transmitting audiovisual data and when the data is first presented to the user. Faster delivery and presentation results in improved performance of the application presenting the audiovisual content. Any application that provides multimedia playback over a channel of limited bandwidth, such as from a CD-ROM or DVD for example, will benefit from the latency minimizing techniques of the present invention.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method of presenting time-varying multimedia content, the method comprising:
   receiving in a buffer a lower quality data stream for an initial portion of the multimedia content wherein the lower quality data stream is received at a rate faster than a real-time playback rate for the multimedia content, the lower quality data stream having been encoded at a bit rate below a transmission rate;
   receiving in the buffer a higher quality data stream of a subsequent portion of the multimedia content, the higher quality data stream having been encoded at a bit rate that equals the transmission rate;

presenting the initial portion of the multimedia content at the real-time playback rate;

presenting the subsequent portion of the multimedia content at the real-time playback rate; and wherein receiving the initial portion faster than the real-time playback rate provides for a reduction of the latency due to buffering by a desired amount.

2. The method of presenting multimedia content as claimed in claim 1, wherein the latency due to buffering is reduced to near zero.

3. The method of presenting multimedia content as claimed in claim 1, wherein the act of receiving in a buffer a lower quality data stream comprises receiving an embedded bit stream having a reduced number of enhancement layers.

4. The method of presenting multimedia content as claimed in claim 1, wherein, the lower quality data stream and the higher quality data stream are spliced together forming an encoded bit stream.

5. A video on demand delivery system, the system comprising:

a processor; and a memory operatively coupled to the processor, th e memory comprising computer-program instructions executable by the processor to deliver multimedia data over a network to a client buffer, the computer-program instructions comprising instructions for:

encoding the multimedia data as a n encoded bit stream having an initial portion and a subsequent portion, the initial portion being encoded at a bit rate less than a transmission rate, the subsequent portion being encoded at a bit rate equal to the transmission rate; and transmitting the initial portion faster than real-time at a bit rate equal to the transmission rate such that the client buffer receives the initial portion faster than the initial portion is removed from the client buffer during real-time playback of the content.

6. The video on demand delivery system as claimed in claim 5, the application further causing the system to construct the encoded bit stream having the initial portion represented with a low resolution encoding and the subsequent portion represented with an encoding having a higher resolution than the low resolution encoding.

7. A video on demand delivery system as claimed in claim 5, further comprising tools enabling a user to manage the delivery of the multimedia data.

8. A method of transmitting time-varying multimedia data between a server and a client, the method comprising:

transmitting an encoded bit stream for the data from the server to the client, the encoded bit stream having an initial portion represented with a low resolution encoding and a subsequent portion represented with an encoding having a higher resolution than the low resolution encoding;

receiving the encoded bit stream by a buffer of the client so that the initial portion is received faster by the buffer than the initial portion is removed from the buffer during real-time presentation of the multimedia data;

presenting in real-time the initial portion of the encoded bit stream with an application on the client;

presenting in real-time the subsequent portion of the encoded bit stream with the application on the client; and wherein transmission of the initial portion of the encoded bit stream stops and transmission of the subsequent portion begins when the buffer of the client contains enough data to prevent underflow or overflow while presenting the subsequent portion of the encoded bit stream.

9. A method of transmitting time-varying multimedia data as claimed in claim 8, wherein the initial portion of the encoded bit stream is encoded at a bit rate below a transmission bit rate.

10. A method of transmitting time-varying multimedia data as claimed in claim 9, wherein the subsequent portion of the encoded bit stream is encoded at a bit rate equal to the transmission bit rate.

11. A video on demand delivery system as recited in claim 5, wherein the computer-program instructions further comprise instructions for:

stopping transmission of the initial portion as a function of whether the client buffer has received enough of the initial portion to guard against underflow of the buffer during decoding operations; and transmitting the subsequent portion to the client buffer.

12. A computer-readable media having computer-executable instructions for presenting time-varying multimedia content, the computer-executable instructions comprising instructions for:

receiving in a buffer a lower quality data stream for an initial portion of the multimedia content wherein the lower quality data stream is received at a rate faster than a real-time playback rate for the multimedia content, the lower quality data stream having been encoded at a bit rate below a transmission rate;

receiving in the buffer a higher quality data stream of a subsequent portion of the multimedia content, the higher quality data stream having been encoded at a bit rate that equals the transmission rate;

presenting the initial portion of the multimedia content at the real-time playback rate;

presenting the subsequent portion of the multimedia content at the real-time playback rate; and wherein receiving the initial portion faster than the real-time playback rate provides for a reduction of the latency due to buffering by a desired amount.

13. A computer-readable media as recited in claim 12, wherein the computer-executable instructions further comprise instructions for:

stopping transmission of the initial portion as a function of whether the client buffer has received enough of the initial portion to guard against underflow of the buffer during decoding operations; and transmitting the subsequent portion to the client buffer.

14. A computer-readable memory having computer-executable instructions to deliver multimedia data over a network to a client buffer, the computer-executable instructions comprising instructions for:

encoding the multimedia data as an encoded bit stream having an initial portion and a subsequent portion, the initial portion being encoded at a bit rate less than a transmission rate, the subsequent portion being encoded at a bit rate equal to the transmission rate; and transmitting the initial portion faster than real-time at a bit rate equal to the transmission rate such that the client buffer receives the initial portion faster than the initial portion is removed from the client buffer during real-time playback of the content.

15. A computer-readable memory as recited in claim 14, wherein the instructions for encoding generate the encoded bit stream such that the initial portion represents low resolution encoding and the subsequent portion represents a higher resolution encoding as compared to the low resolution encoding.

16. A computer-readable media having computer-executable instructions for transmitting time-varying multimedia data between a server and a client, the computer-executable instructions comprising instructions for:

transmitting an encoded bit stream for the data from the server to the client, the encoded bit stream having an initial portion represented with a low resolution encoding and a subsequent portion represented with an encoding having a higher resolution than the low resolution encoding;

receiving the encoded bit stream by a buffer of the client so that the initial portion is received faster by the buffer than the initial portion is removed from the buffer during real-time presentation of the multimedia data;

presenting in real-time the initial portion of the encoded bit stream with an application on the client;

presenting in real-time the subsequent portion of the encoded bit stream with the application on the client; and wherein transmission of the initial portion of the encoded bit stream stops and transmission of the subsequent portion begins when the buffer of the client contains enough data to prevent underflow or overflow while presenting the subsequent portion of the encoded bit stream.

17. A computer-readable medium as recited in claim 16, wherein the initial portion of the encoded bit stream is encoded at a bit rate below a transmission bit rate.

18. A computer-readable medium as recited in claim 17, wherein the subsequent portion of the encoded bit stream is encoded at a bit rate equal to the transmission bit rate.

* * * * *